L. S. LACHMAN.
METAL VEHICLE WHEEL.
APPLICATION FILED JULY 31, 1918.
1,385,380.
Patented July 26, 1921.
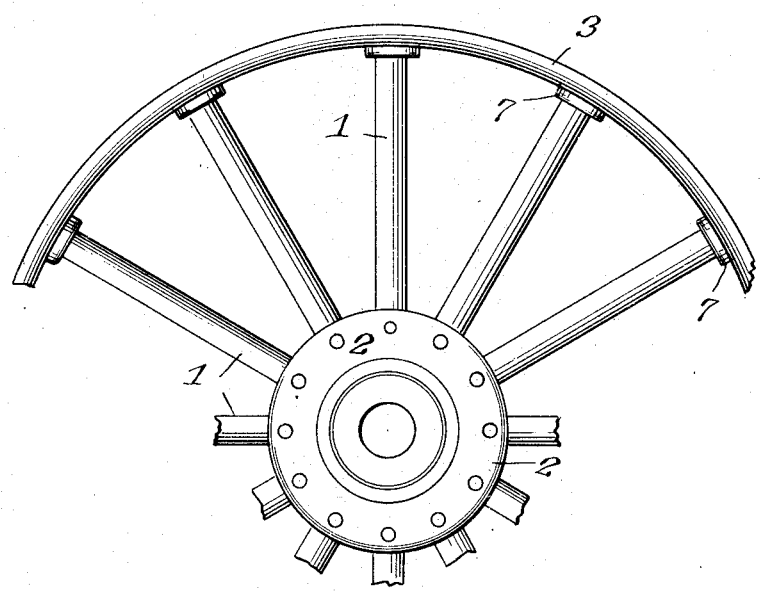
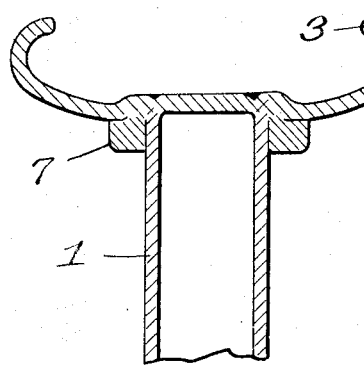
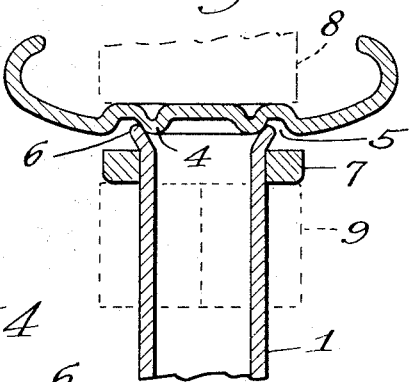
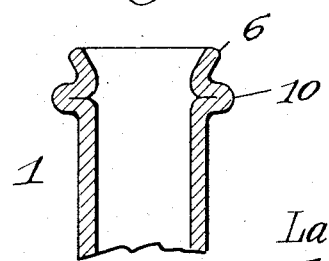
INVENTOR
Laurence S. Lachman
BY
Townsend & Decker
ATTORNEYS

UNITED STATES PATENT OFFICE.

LAURENCE S. LACHMAN, OF NEW YORK, N. Y., ASSIGNOR, BY MESNE ASSIGNMENTS, TO BETHLEHEM STEEL COMPANY, OF BETHLEHEM, PENNSYLVANIA, A CORPORATION OF PENNSYLVANIA.

METAL VEHICLE-WHEEL.

1,385,380.     Specification of Letters Patent.     Patented July 26, 1921.

Application filed July 31, 1918. Serial No. 247,498.

*To all whom it may concern:*

Be it known that I, LAURENCE S. LACHMAN, a citizen of the United States, and a resident of New York, in the county of New York and State of New York, have invented certain new and useful Improvements in Metal Vehicle-Wheels, of which the following is a specification.

My present invention relates to metal vehicle wheels and the method of making the same, the object being to construct the wheel with spokes consisting of metal tubes and to secure the spokes to the rim in a cheap, strong and efficient manner and also to secure perfect concealment of the union.

To these ends the invention consists in securing the spokes to the rim and concealing the joint in the manner hereinafter more particularly described and then specified in the claims.

In the accompanying drawings Figure 1 is a side elevation of a wheel embodying the invention.

Fig. 2 is a vertical transverse section through the rim at the point of union of the tubular spoke therewith.

Fig. 3 is a vertical transverse section through the rim showing the parts assembled for welding.

Fig. 4 is a longitudinal section through one end of a spoke formed in an alternative manner for use in this invention.

1 indicates tubular spokes secured to the hub 2 in any well known or suitable manner. 3 indicates the usual metal rim shown in the present instance as adapted to receive an inflated tire.

The rim 3 is provided with an annular projection at each place it is desired to secure a spoke, said projection being preferably in the form of a rib or ridge 4 formed in a countersink 5 so that the top of the projection is approximately flush with the outer surface of the rim 3. The rib or projection 4 may be formed in any suitable manner.

The end of each spoke is flared outwardly as at 6 and this flared end is brought into sidewise engagement embracing the annular projection 4 as shown in Fig. 3. A collar 7 forming a flange on the tubular spoke 1 seats against the flared end 6 and the whole is assembled between electric current supplying contacts 8, 9 shown in dotted lines in Fig. 3. Current is passed from one electrode to the other and pressure is applied as the work softens, the flared end 6 welding to the ridge 4 and the collar 7 welding to the flared end 6 due to the current passing from the collar across the joints to the ridge 4.

The metal upsets due to the pressure and more or less fills up the countersink 5. The final welding pressure forces the collar 7 against the surface of the rim 3 thereby closing and concealing the countersink and upset metal. By this construction the expense of grinding off or otherwise removing the upset metal or bur is avoided.

If desired the flange for closing the countersink may be formed integrally with the tube 1 as indicated at 10 Fig. 4.

It will be understood that modifications in the manner of carrying out the invention may be resorted to without departing from the spirit thereof as set forth in the appended claims.

What I claim as my invention is:

1. The method of making a metal wheel having tubular spokes combined with a metal rim consisting in providing the rim with an annular projection formed in a countersink, bringing the flared end of the spoke into engagement with said annular projection and welding them together, the upset metal due to pressure being received in the countersink.

2. The method of making a metal wheel having tubular spokes combined with a metal rim consisting in providing the rim with an annular projection, providing the spoke with a flared end, applying the spoke so that the flared end will embrace the projection and applying pressure and current to weld the rim and spoke together.

3. The method of making a metal wheel having tubular spokes and rim consisting in providing the rim with annular projections and said spokes with flared ends adapted to embrace said projections and with a flange projecting laterally from it near the end, assembling the parts and applying pressure and current to weld the flared end to the projection and to cause the flange to conceal the upset metal caused by the weld.

4. The method of making a metal wheel comprising tubular spokes and a metal rim consisting in providing the rim with an annular projection countersunk in said rim, providing a spoke with a flared end and with a flange projecting laterally from it, assembling the parts in a welding machine and applying pressure and current to weld the flared end to the projection and to the flange, the upset metal received in the countersink being covered by said flange.

5. The method of making a metal wheel having tubular spokes and a metal rim consisting in providing said rim with an annular countersunk rib or ridge, providing the spoke with a flared end and with a collar adapted to engage the rim, assembling the parts and applying pressure to weld the spoke to the projection to cause the collar to engage the rim and close the countersink.

6. The method of making a metal wheel having tubular spokes and a metal rim welded together and having the weld concealed by a collar, consisting in providing the wheel with a rim or projection countersunk therein, providing a spoke with an end adapted to engage said rim for the welding operation, applying a separate collar to said spoke near its end, assembling the parts and applying pressure to weld the spoke to the rim and the collar to the spoke and at the same time cause the collar to close the countersunk portion and conceal the upset metal received therein in the welding operation.

7. The method of making a metal wheel comprising tubular spokes and a metal rim consisting in providing the rim with a welding projection, providing the spoke with a separate collar near its end, assembling the parts with the spoke end engaging said projection and applying pressure and current to weld the spoke end to the rim and the collar to the spoke end and to cause the collar to engage the rim and conceal the joint.

Signed at New York, in the county of New York and State of New York, this 18th day of July A. D. 1918.

LAURENCE S. LACHMAN.

Witnesses:
F. B. TOWNSEND,
F. E. KOLSLER.